United States Patent
Sakata et al.

[11] Patent Number: 5,975,453
[45] Date of Patent: Nov. 2, 1999

[54] SOUND-ABSORBING MATERIAL AND A CABLE REEL INCLUDING THE SAME

[75] Inventors: Tomoyuki Sakata, Nagoya; Tetsuya Iizuka; Akihito Maegawa, both of Yokkaichi, all of Japan

[73] Assignees: Sumitomo Wiring Systems, Ltd.; Harness System Technologies Research, Ltd.; Sumitomo Electric Industries, Ltd.

[21] Appl. No.: 09/127,178

[22] Filed: Jul. 31, 1998

[30] Foreign Application Priority Data

Aug. 8, 1997 [JP] Japan ................................. 9-214961

[51] Int. Cl.⁶ .......................... B65H 75/34; H01R 39/02; G10K 11/162; B32B 25/04
[52] U.S. Cl. ........................... 242/388; 439/15; 428/421; 428/493; 181/291; 181/294
[58] Field of Search ................................. 242/388, 388.9, 242/388.91, 398; 439/15, 164; 181/284, 288, 290, 291, 292, 293, 294; 428/492, 493, 421, 483

[56] References Cited

U.S. PATENT DOCUMENTS

| | | | |
|---|---|---|---|
| 4,921,428 | 5/1990 | Sasaki et al. | 439/15 |
| 5,100,331 | 3/1992 | Banfelder | 439/15 |
| 5,496,628 | 3/1996 | Ribbans | 428/421 |
| 5,707,023 | 1/1998 | Ickikawa et al. | 242/388 |
| 5,798,181 | 8/1998 | Hobson et al. | 428/422 |
| 5,866,266 | 2/1999 | Takasu | 428/421 |

FOREIGN PATENT DOCUMENTS 104471  4/1996  Japan .

*Primary Examiner*—John M. Jillions
*Attorney, Agent, or Firm*—Jordan B. Bierman; Bierman, Muserlian and Lucas

[57] ABSTRACT

A sound-absorbing material and a cable reel including the same is produced inexpensively and attenuates sliding noise and vibration noise. A sound-absorbing material 20 has a dual layer structure comprising an upper rubber sheet 20b and a lower rubber sheet 20a. A front side surface 20e of the lower rubber sheet 20a and a back side surface 20f of the upper rubber sheet 20b are provided with a number of protrusions 20c and 20d, respectively. The front side surface 20e is opposed to the back side surface 20f through the protrusions 20c and 20d. The upper and lower rubber sheets 20b and 20a are integrated together by interconnecting the peripheral edges of the sheets to form the sound-absorbing material 20. The sound-absorbing material 20 has a thickness of about 1.3 mm and an air layer 21 between the upper and lower rubber sheets 20b and 20a. Sounds transmitted to the sound-absorbing material 20 are struck at the protrusions 20c and 20d, are reflected on the protrusions irregularly, and are attenuated in the material 20.

16 Claims, 5 Drawing Sheets

SOUND-ABSORBING MATERIAL AND A CABLE REEL INCLUDING THE SAME

BACKGROUND OF THE INVENTION

This invention relates to a sound-absorbing material and a cable reel including the same, and more particularly it relates to a sound-absorbing material preferably adapted to be used in a cable reel which is mounted on a steering device for an automotive vehicle and electrically interconnects a stationary member assembly and a movable member assembly through a flat cable.

In an automotive vehicle equipped with an air bag, a cable reel is provided in a steering wheel in order to supply an electrical power to an air bag system. For convenience of explanation, such a cable reel will be described below by referring to the drawings. FIGS. 7A to 7C show an example of a conventional cable reel. FIG. 7A is a schematic longitudinal sectional view of a conventional cable reel. FIG. 7B is a perspective view of a conventional sound-absorbing material. FIG. 7C is a fragmentary cross sectional view of the sound-absorbing material shown in FIG. 7B.

As shown in FIG. 7A, the conventional cable reel includes a movable member assembly 10 which rotates together with a steering wheel, and a stationary member assembly 11 which is secured to a stationary shaft on a body frame. The movable and stationary member assemblies 10 and 11 define an annular cable containing chamber 12 which accommodates a flat cable 15 in a coiled manner. Opposite ends of the flat cable 15 in the coiled manner are connected to lead wires which are led out from the movable and stationary member assemblies 10 and 11, respectively, to be connected to an external connector or electrical wires. In such a cable reel, the flat cable 15 is wound in the cable containing chamber 12 when the steering wheel is turned in either a clockwise or counter clockwise direction while the flat cable 15 is unwound in the chamber 12 when the steering wheel is turned in the other direction, so that a device (air bag) on the steering wheel is electrically connected to a power source on the body frame.

The cable reel involves a problem in that an unpleasant sliding noise is generated when the lateral opposite edges of the flat cable 15 slide on upper and lower bearing surfaces of the cable containing chamber 12 upon winding and unwinding of the flat cable 15 in the chamber 12. The flat cable 15 caused to vibrate in an axial direction (from an upper to lower direction or from a lower to upper direction) of the steering wheel during idling or driving of the automotive vehicle, thereby giving rise to an unpleasant vibration noise due to collision between the bearing surfaces of the chamber 12 and the lateral opposite edges of the flat cable 15.

Japanese Utility Model Publication No. HEI 6-36040 (1994) discloses a cable reel in which a highly lubricative sheet such as a polytetrafluoroethylene (PTFE) resin or the like is adhered to at least one of bearing surfaces of a cable containing chamber in order to attenuate sliding noise. Also Japanese Patent Public Disclosure No. HEI 8-104471 (1996) discloses a cable reel in which a sound-absorbing material made of a resilient material such as a rubber or the like or a sound-absorbing material with the polytetrafluoroethylene (PTFE) resin is attached to bearing surfaces of stationary and movable member assemblies by means of clamps provided on the surfaces.

A polytetrafluoroethylene resin sheet is adhered by way of PET (polyethylene telephthalate) to a surface of a rubber sheet since the former lacks adhesion to the latter.

Although the polytetrafluoroethylene resin sheet disclosed in Japanese Utility Model Publication No. HEI 6-36040 (1994) can attenuate sliding noise on account of its high lubrication, it cannot reduce noise which is caused by collision of the flat cable onto the bearing surfaces of the cable reel due to axial vibrations of the cable in swirl. In particular, such unpleasant collision noise is likely to be accentuated when an engine is idling. On the other hand, the resilient sheet disclosed in Japanese Patent Public Disclosure No. HEI 8-104471 (1996) hardly attenuates sliding noise, since the lubrication between the flat cable and the resilient sheet is poor, although the sheet can reduce the collision or vibration noise.

In a sound-absorbing material 50 shown in FIG. 7C, a rubber sheet 50a having a polytetrafluoroethylene (PTFE) resin sheet 50c provided thereon can attenuate and absorb both a sliding and vibration noise by means of a highly lubricative resin and rubber sheet.

As shown in FIG. 7C, however, the rubber sheet 50a cannot effectively absorb sliding noise and thus cannot obtain a substantial sound-absorbing effect since the sheet 50a is a flat plate having a single layer.

Also, as shown in FIGS. 7A and 7B, a rubber sheet 50a, a polyethylene telephthalate (PET) film 50b and a polytetrafluoroethylene (PTFE) resin sheet 50c must be punched out into an annular shape adapted to be used, since the bearing surfaces of the cable containing chamber 12 is in an annular form. Consequently, this involves much loss of material. In particular, a total cost of the cable reel becomes high since the PTFE resin sheet is expensive.

In addition, the above sound-absorbing material involves a high cost due to an increase in working steps, since the PET film 50b is adhered to the rubber sheet 50a through an adhesive and then the PTFE resin sheet 50c is attached to the PET film 50b by way of an adhesive.

Moreover, the above sound-absorbing material gives rise to a problem in that it reduces a sound-absorbing effect since the hard PET film 50b is interposed between the rubber sheet 50a having a sound-absorbing function and the PTFE resin sheet 50c having a lubricative function. It is difficult to produce the PTFE resin sheet 50c having a low thickness since it is produced by means of skiving. Consequently, the sheet 50c on the market is usually more than 20 $\mu$m. Such a thick PTFE resin sheet 50c in addition to the hard PET film 50b will lower the sound-absorbing function.

SUMMARY OF THE INVENTION

An object of the present invention is to provide a sound-absorbing material and a cable reel including the same which can effectively attenuate both a sliding and vibration noise and which can be produced inexpensively.

In order to achieve the above object, a sound-absorbing material in accordance with the present invention comprises: two rubber sheets piled on each other, at least one of the two rubber sheets being provided on the inner surface with a ragged portion to define an air layer between the rubber sheets; and a highly lubricative layer formed directly on the outer surface of the one rubber sheet by coating the outer surface with a fluororesin system coating agent mixed with an adhesive.

The air layer can be formed between the two rubber sheets since each opposing surface of at least one of the two rubber sheets is formed into a ragged surface. It is possible to attenuate noise with a high degree of efficiency by directing the noise onto the ragged surface of the rubber sheet. Thus, the sound-absorbing material of the present invention can absorb the noise with a high degree of efficiency.

In the prior art, the polytetrafluoroethylene resin is formed into a sheet beforehand and the resin sheet is attached to the rubber sheet through the PET film, since it is difficult to directly adhere the resin sheet to the rubber sheet. However, in the sound-adsorbing material of the present invention, a fluororesin system coating agent in a liquid form is mixed with the adhesive prior to being formed into a sheet, and the mixture in a liquid form is applied directly onto the surface of the rubber sheet by means of a spray, a brush, or a roller, and then the coated layer is heated to a given temperature and hardened to form a very thin and highly lubricative coating layer on the rubber sheet.

When the fluororesin system coating agent is used as it is and the agent mixed with the adhesive is applied onto the rubber sheet, the agent will fit on the rubber sheet and thus it is possible to directly form the highly lubricative coating layer made of the fluororesin system coating agent on the rubber sheet: without using the PET. The application of the fluororesin system coating agent on the rubber sheet makes the thickness of the coating layer less than that of the conventional resin sheet, and as PET is not used, the sound-absorbing function of the rubber sheet can be enhanced, and an adhesion step for a PET film and a PTFE resin sheet can be eliminated, thereby reducing work processes. It should be noted that a highly lubricative coating layer can be formed on a rubber sheet by first applying an adhesive on the rubber sheet and then applying a pure fluororesin system coating agent having no adhesive by means of a spray or the like.

Preferably, the fluororesin system coating agent may be a PTFE resin. A mixture of the fluororesin system coating agent of 95% in weight and the adhesive (prior to being hardened) of 5% in weight is preferable. If the fluororesin system coating agent is less than 95% in weight, lubrication of the agent becomes poor. If the adhesive is less than 5% in weight, adhesion becomes poor.

In the sound-absorbing material, the ragged portion on the entire inner surface of the one rubber sheet may include a number of tip-shaped or stripe-shaped protrusions to define an air layer between the two rubber sheets. The ragged portion in either the tip-shaped protrusions or stripe-shaped protrusions can absorb the noise efficiently.

A sheet made of polyethylene telephthalate (PET) is attached to the outer surface of the other rubber sheet through an adhesive. This makes it easy to attach the rubber sheet to another member.

A cable reel having any one of the above sound-absorbing materials, comprises: a stationary member assembly; a movable member assembly mounted on the stationary member assembly; a cable containing chamber formed into an annular configuration by the stationary and movable member assemblies, the chamber being adapted to contain a flat cable in a coiled manner therein; and means for electrically leading opposite ends of the flat cable out from the stationary and movable member assemblies, respectively. The sound-absorbing material is attached to at least one of bearing surfaces of the cable containing chamber which face opposite lateral edges of the flat cable. The one bearing surface is adapted to bear a weight of the flat cable.

The cable reel described above is attached to a steering device of an automotive vehicle to supply electrical power to an air bag system. When the movable member assembly which rotates with a steering wheel is turned to one direction, the flat cable is wound in the cable containing chamber in the cable reel while the flat cable is unwound when the assembly is turned in the other direction. The lateral opposite edges of the flat cable, in particular, the lateral lower edge which is subject to its own weight, slide on the bearing surfaces of the cable containing chamber, in particular, the lower bearing surface during rotary motion. Since the highly lubricative thin coating layer made of the PTFE resin or the like is formed on the rubber sheet mounted on the bearing surface of the cable containing chamber, it is possible to allow the flat cable to smoothly rotate on the bearing surface, thereby suppressing sliding noise.

Even if the flat cable vibrates in the axial direction of the cable reel due to vibration of the engine during an idling mode or a driving mode and the lateral lower edge of the flat cable collides on the lower bearing surface of the cable containing chamber, an unpleasant vibration noise is attenuated by the ragged portion in the air layer defined between the two rubber sheets and sliding noise is attenuated by the highly lubricative coating layer. In particular, since the highly lubricative coating layer on the rubber sheet is extremely thin, the layer does not interfere with the sound-absorbing function of the rubber sheet.

The sound-absorbing material having an annular configuration may be attached to the bearing surface of the cable containing chamber having an annular configuration. Alternatively, the sound-absorbing material including a plurality of sector pieces may be attached at an equidistance in a circumferential direction to the bearing surface of the cable containing chamber having an annular configuration. Each of the sector pieces is divergent from an inner peripheral edge of the bearing surface to an outer peripheral edge of the bearing surface.

The sector pieces can be partially disposed on the bearing surface. Consequently, the contact area between the sound-absorbing material and the flat cable becomes small and thus can attenuate both sliding noise and vibration noise.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE PREFERRED EMBODIMENTS

Figure 7A:
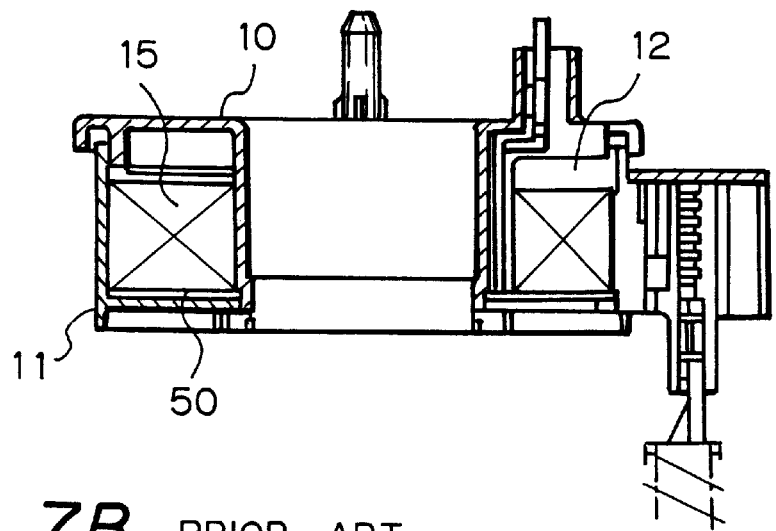
FIG. 7A is a schematic longitudinal sectional view of a conventional cable reel.
Figure 7B:
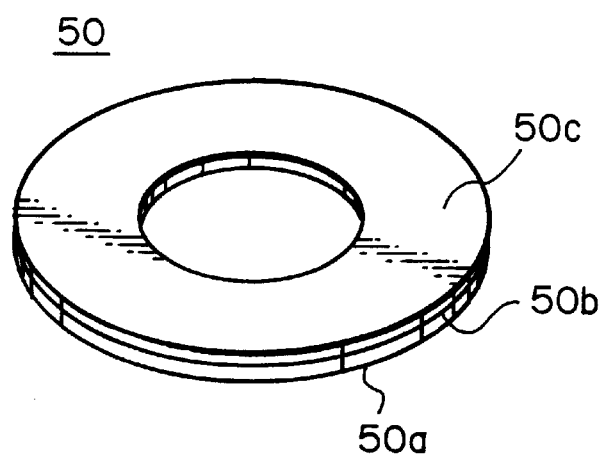
FIG. 7B is a schematic perspective view of a conventional sound-absorbing material to be accommodated in the cable reel shown in FIG. 7A.
Figure 7C:
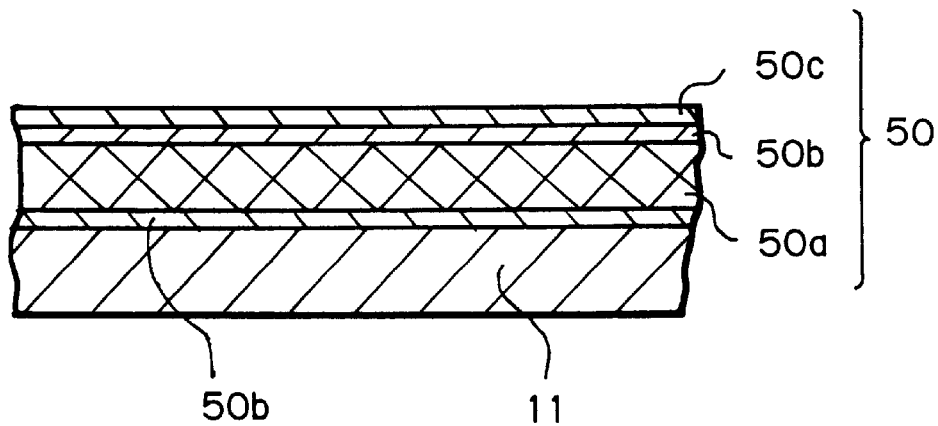
FIG. 7C is a fragmentary cross sectional view of the sound-absorbing material shown in FIG. 7B.

Embodiments of a sound-absorbing material and a cable reel including the same in accordance with the present invention will be explained below by referring to FIGS. 1 to 6. In an embodiment of the present invention, the sound-absorbing material is attached to a cable reel mounted on a steering device in an automotive vehicle. A main body of the cable reel of the present invention has the same structure as that of the conventional cable reel shown in FIG. 7A. In both structures, the same members are indicated by the same reference numbers.

The cable reel of the present invention includes a movable member assembly 10 which is secured to a steering wheel (not shown) to be turned together with it, and a stationary member assembly 11 which is secured to a shaft (not shown) fixed on a body frame. The movable member assembly 10 has an upper wall 10a and an inner peripheral wall 10b while the stationary member assembly 11 has a lower wall 11a and an outer peripheral wall 11b. The movable and stationary member assemblies 10 and 11 define an annular cable containing chamber 12. The cable containing chamber 12 accommodates a flat cable 15 in a coiled manner. An inner end of the flat cable 15 in a coiled manner is connected to a lead wire 13 which is led out through an attaching hole 10c in the upper wall 10a of the movable member assembly 10. An outer end of the flat cable 15 in a coiled manner is connected to a lead wire 14 which is led out from the stationary member assembly 11. The flat cable 15 is wound in the cable containing chamber 12 when the steering wheel is turned in one direction while the flat cable 15 is unwound in the chamber 12 when the steering wheel is turned in the other direction. Thus, lead wires 13 and 14 are electrically coupled to each other through the flat cable 15, even if the steering wheel is turned to either direction.

Figure 1:
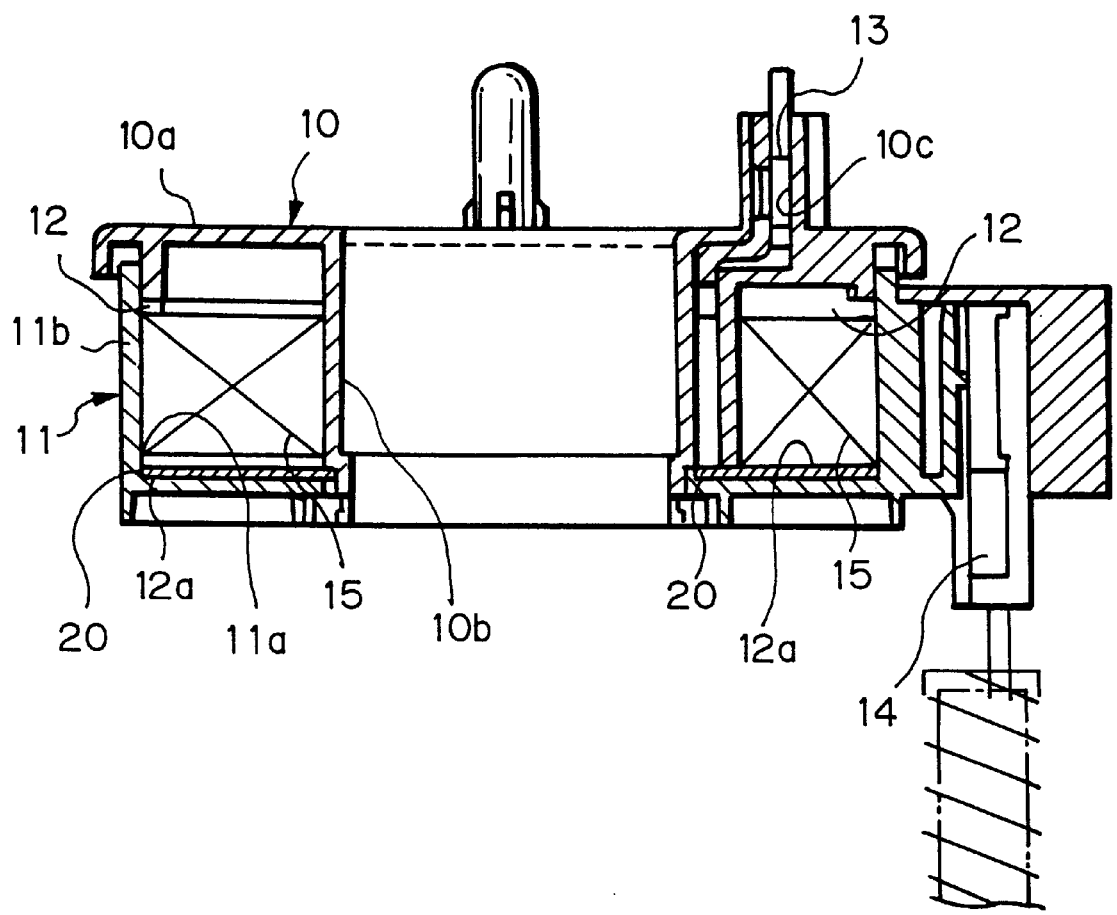
FIG. 1 is a schematic longitudinal sectional view of a cable reel in accordance with the present invention.
Figure 2:
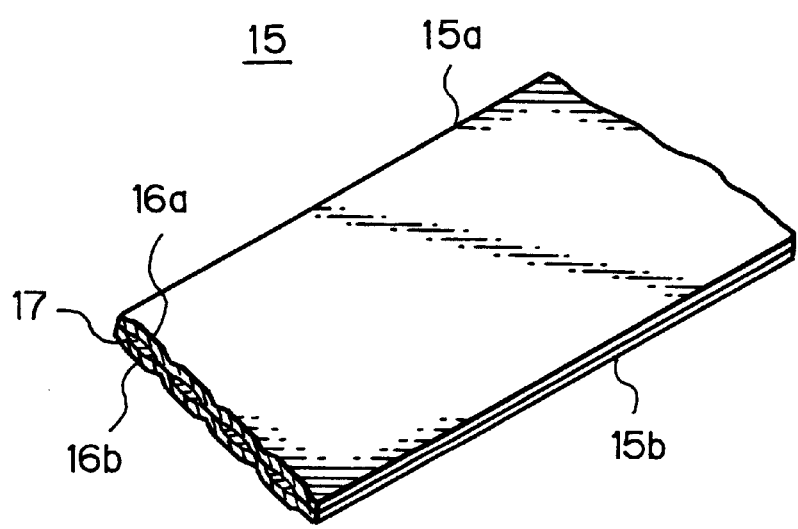
FIG. 2 is a schematic perspective view of a part of a flat-cable to be accommodated in a cable containing chamber of the cable reel shown in FIG. 1.
Figure 3:
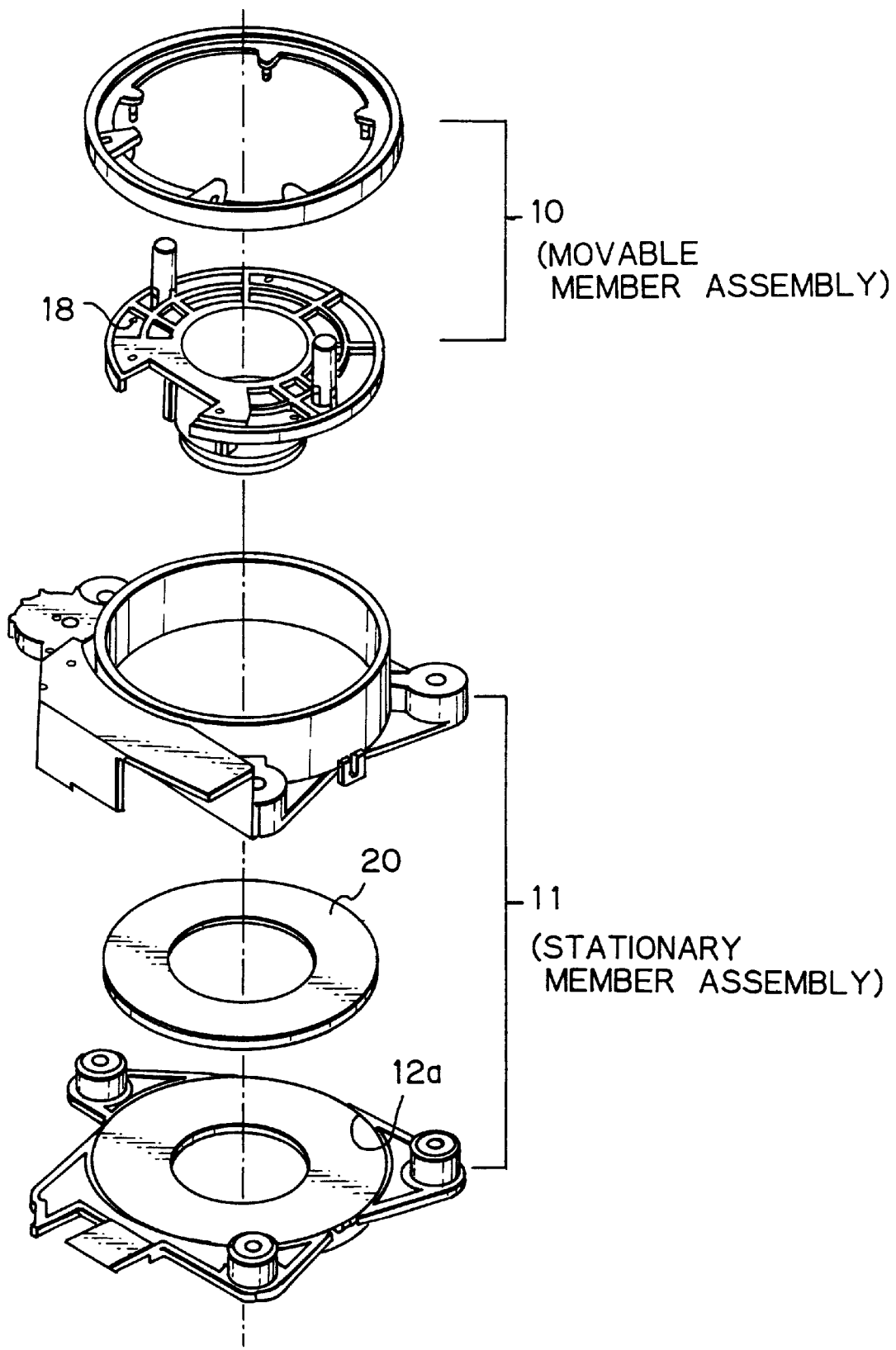
FIG. 3 is an exploded perspective view of the cable reel shown in FIG. 1, illustrating main members constituting the cable reel.

The flat cable 15, as shown in FIG. 2, includes a pair of insulation resin films 16a and 16b, and a conductive material 17 interposed between the films 16a and 16b. The flat cable 15 is wound and unwound in the cable containing chamber 12 while either one of lateral opposite edges 15a and 15b of the flat cable 15 is sliding on a lower annular flat bearing surface 12a of the cable containing chamber 12. Accordingly, a sound-absorbing material 20 is mounted on the lower bearing surface 12a, as shown in FIG. 3.

On the other hand, the cable containing chamber 12 is provided on the upper wall with a plurality of elongate ribs 18 each of which extends radially and is spaced apart at a given distance in the circumferential direction. There is a slightly small clearance between the ribs 18 and the lateral upper edge 15a of the flat cable 15. Thus, no sliding noise is caused on the upper side in the cable containing chamber 12. The sound-absorbing material 20 may be mounted on the upper flat annular wall of the cable containing chamber 12 without providing the ribs 18 on the wall.

The sound-absorbing material 20 in the first embodiment is formed into substantially the same annular configuration as the lower annular bearing surface 12a of the stationary member assembly 11.

Figure 4A:
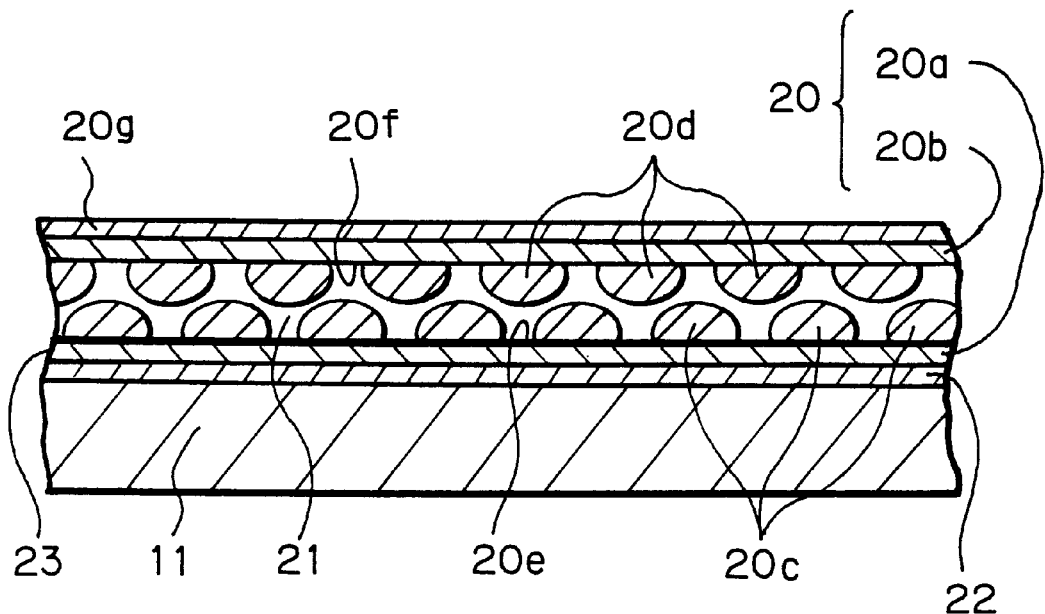
FIG. 4A is a fragmentary enlarged cross sectional view of a sound-absorbing material in accordance with the present invention.
Figure 4B:
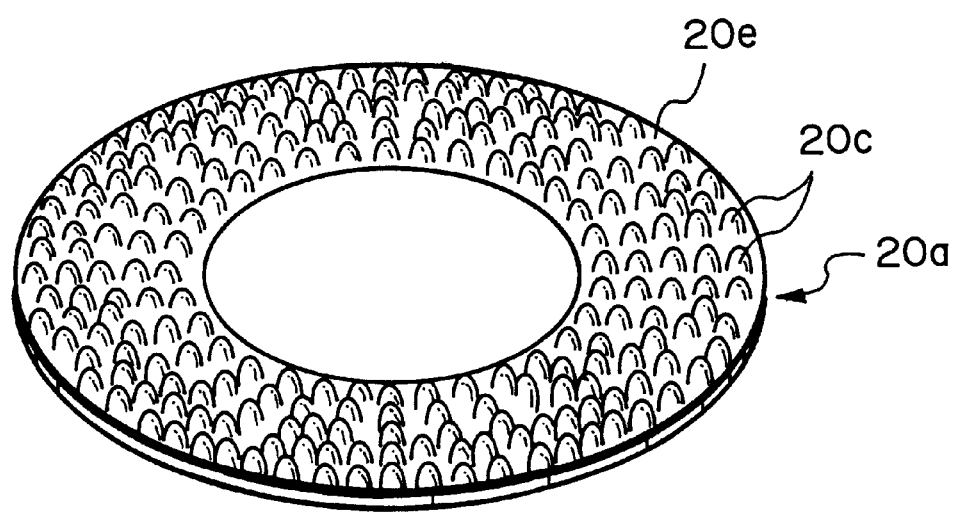
FIG. 4B is a fragmentary enlarged perspective view of a first embodiment of the sound-absorbing material.

As shown in FIGS. 4A and 4B, the sound-absorbing material 20 has a dual layer structure comprising an upper rubber sheet 20b and a lower rubber sheet 20a, a front side surface 20e of the lower rubber sheet 20a and a back side surface 20f of the upper rubber sheet 20b are provided with a number of tip-shaped protrusions or ragged portions 20c and 20d, respectively. The front side surface 20e is opposed to the back side surface 20f through the protrusions 20c and 20d. The upper and lower rubber sheets 20b and 20a are integrated together by interconnecting the peripheral edges of the sheets to form the sound-absorbing material 20 having a thickness of about 1.3 mm.

Thus, an air layer 21 is defined between the opposing surfaces 20e and 20f of the lower and upper rubber sheets 20a and 20b by means of the protrusions 20c and 20d. Consequently, sounds transmitted to the sound-absorbing material 20 are struck at the protrusions or the ragged portions 20c and 20d, are reflected on the protrusions irregularly, and are attenuated in the material 20. Thus, the sounds are effectively absorbed in the material 20.

Also, a highly lubricative coating layer 20g made of a fluororesin system material is formed on a surface of the sound-absorbing material 20, that is, a surface of the upper rubber sheet 20b.

The highly lubricative coating layer 20g is formed on the entire front side surface of the upper rubber sheet 20b by mixing an adhesive in liquid form (for example, an acrylic system adhesive) in the polytetrafluoroethylene resin, spraying such a mixed liquid on the entire surface of the annular rubber sheet 20b to form a layer having a given thickness (for example 3 μm), heating at a given temperature, and hardening the layer. At that time, although it is difficult to adhere an polytetrafluoroethylene resin through an adhesive to the rubber sheet, a mixture of the polytetrafluoroethylene resin in liquid form and the adhesive in liquid form can be securely adhered to the rubber sheet 20b.

The sound-absorbing material 20 constructed by the above manner is adhered to the lower bearing surface 12a of the stationary member assembly 11 through the PET film by means of the adhesive 23. When the lateral lower edge 15b of the flat cable 15 slides on the highly lubricative coating layer 20g made of the polytetrafluoroethylene resin, sliding noise is attenuated.

Also, vibration noise is generated by the axial vibration of the flat cable 15 during the idling mode or the driving mode of the engine, when the flat cable 15 collides on the lower sound-absorbing material 20 in the empty weight direction. Such a vibration noise is struck on the protrusions 20c and 20d of the lower and upper rubber sheets 20a and 20b, thereby being absorbed in the sheets.

Moreover, since the highly lubricative coating layer 20g is formed into an extremely thin layer (3 μm in this embodiment) by applying the fluororesin coating agent to the upper rubber sheet 20b, although the layer 20g itself is hard, the layer 20g does not interfere with the sound-absorbing function of the rubber sheet 21.

Consequently, vibration noise as well as sliding noise can be reduced by the sound-absorbing material 20.

Figure 5:
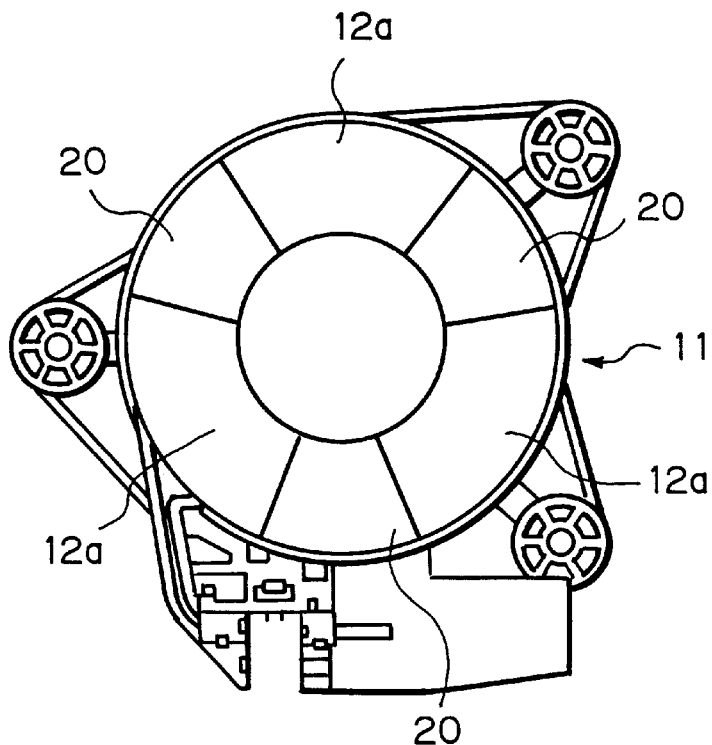
FIG. 5 is a plan view of the cable containing chamber in the cable reel, illustrating a second embodiment of the sound-absorbing material attached to a bearing surface of the cable containing chamber.
Figure 6:
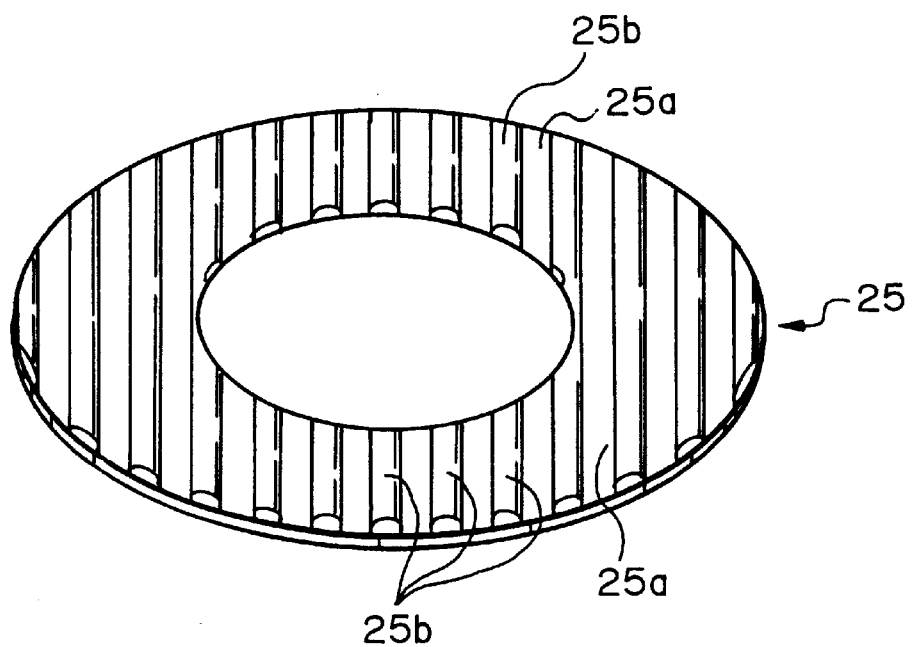
FIG. 6 is a fragmentary enlarged perspective view of n alteration of the sound-absorbing material in accordance with the present invention.

FIG. 5 shows a second embodiment of the cable reel having the sound-absorbing material 20 in accordance with the present invention. The second embodiment is the same as the first embodiment except that the sound-absorbing material 20 includes three sectoral pieces and each sectoral piece is disposed on the lower annular bearing surface 12a of the stationary member assembly 11 by an equal distance in a circumferential direction.

Each sound-absorbing material 20 in the second embodiment has a dual layer structure including an upper rubber sheet 20b and a lower rubber sheet 20a in the same manner as that in the first embodiment. The upper and lower rubber sheets 20b and 20a are provided on opposing surfaces 20f and 20e with tip-shaped protrusions, respectively. An air layer 21 is defined between the upper and lower rubber sheets 20b and 20a.

Since the sound-absorbing material 20 is divided into three sectoral pieces and the sectoral pieces are spaced apart from each other in a circumferential direction on the lower bearing surface 12a of the assembly 11, a total contact area between the sound-absorbing material 20 and the lateral edge of the flat cable 15 becomes small, thereby reducing sliding noise and vibration noise.

Although a number of tip-shaped protrusions 20c and 20d are formed on the opposing surfaces 20e and 20f of the rubber sheets 20a and 20b in the first and second embodiments, the rubber sheet 25 may be provided on a surface 25a with stripe-shaped protrusions 25b.

Although the tip-shaped projections 20c and 20d are formed on the opposing surfaces 20e and 20f of the rubber sheets 20a and 20b of the sound-absorbing material 20 in the first and second embodiments, the protrusions may be formed on either one of the sheets 20a and 20b in order to obtain a sound-absorbing effect.

It should be noted that the cable reel of the present invention can be attached to not only the steering device but also a similar device. Also, the sound-absorbing material of the present invention can be attached to not only the bearing surface or surfaces of the cable containing chamber but also a surface on which a member slides and collides in order to attenuate sliding noise and vibration noise.

It will be apparent from the foregoing that the sound-absorbing material can highly attenuate the sounds by defining an air layer between the two rubber sheets and bringing the sounds into collision onto the ragged portions in the air layer. This results in a high efficiency of sound-absorbing in comparison with a conventional sound-absorbing material having a single layer structure including a rubber sheet.

Also, it is possible to make the thickness of the highly lubricative coating layer very thin since it is formed by spraying uniformly a liquid mixture of an adhesive and a fluororesin system coating agent such as a PTFE directly onto the surface of the rubber sheet.

Consequently, the bearing surface which bears a lateral edge of the flat cable has a good lubrication, in the case where the sound-absorbing material is applied to the cable reel, thereby reducing sliding noise. Even if the flat cable vibrates in the axial direction of the cable reel and the lower edge of the flat cable collides on the lower bearing surface of the cable reel, vibration noise can be effectively absorbed and attenuated by the projections in the air layer defined between the two rubber sheets. Moreover, the rubber sheet does not interfere with the sound-absorbing function since the highly lubricative coating layer on the rubber sheet is extremely thin in thickness. Thus, the sound-absorbing material of the present invention can effectively reduce both sliding noise and vibration noise.

A quantity of the expensive polytetrafluoroethylene resin to be used can be reduced by 10% to 50% in comparison with the conventional polytetrafluoroethylene resin sheet formed into an annular shape piece by a punching or blanking manner, since the highly lubricative coating layer is very thin and the spraying requires a minimum quantity of the resin. Consequently it is possible to greatly lower a cost of the sound-absorbing material.

Further, in comparison with the conventional method in which the PET film is adhered to the rubber sheet through the adhesive and then the polytetrafluoroethylene resin sheet is adhered to the PET film through the adhesive, the highly lubricative sound-absorbing material of the present invention can be formed merely by applying the fluororesin system coating agent to the surface of the rubber sheet. Thus, it is possible to further lower the cost.

From the above description of the invention, those skilled in the art will perceive improvements, changes and modifications. Such improvements, changes and modifications within the skill of the art are intended to be covered by the appended claims.

The entire disclosure of Japanese Patent Application No. HEI 9-214961 (1997) filed on Aug. 8, 1997 including specification, claims, drawings and summary is incorporated herein by reference in its entirety.

What is claimed is:

1. A sound-absorbing material, comprising:
   two rubber sheets piled on each other, at least one of said two rubber sheets being provided on the inner surface with a ragged portion to define an air layer between said rubber sheets; and
   a highly lubricative layer formed directly on the outer surface of said one rubber sheet by coating said outer surface with a fluororesin system coating agent mixed with an adhesive.

2. A sound-absorbing material according to claim 1, wherein said ragged portion on the entire inner surface of said one rubber sheet includes a number of tip-shaped or stripe-shaped protrusions to define an air layer between said two rubber sheets.

3. A sound-absorbing material according to claim 1, wherein a sheet made of polyethylene telephthalate (PET) is attached to the outer surface of the other rubber sheet through an adhesive.

4. A sound-absorbing material according to claim 2, wherein a sheet made of polyethylene telephthalate (PET) is attached to the outer surface of the other rubber sheet through an adhesive.

5. A cable reel having a sound-absorbing material according to claim 1, comprising:
   a stationary member assembly;
   a movable member assembly mounted on said stationary member assembly;
   a cable containing chamber formed into an annular configuration by said stationary and movable member assemblies, said chamber being adapted to contain a flat cable in a coiled manner therein; and
   means for electrically leading opposite ends of said flat cable out from said stationary and movable member assemblies, respectively;
   wherein said sound-absorbing material is attached to at least one of bearing surfaces of said cable containing chamber which face opposite lateral edges of said flat cable, said one bearing surface being adapted to bear a weight of said flat cable.

6. A cable reel having a sound-absorbing material according to claim 2, comprising:
   a stationary member assembly;
   a movable member assembly mounted on said stationary member assembly;
   a cable containing chamber formed into an annular configuration by said stationary and movable member assemblies, said chamber being adapted to contain a flat cable in a coiled manner therein; and
   means for electrically leading opposite ends of said flat cable out from said stationary and movable member assemblies, respectively;

wherein said sound-absorbing material is attached to at least one of bearing surfaces of said cable containing chamber which face opposite lateral edges of said flat cable, said one bearing surface being adapted to bear a weight of said flat cable.

7. A cable reel having a sound-absorbing material according to claim 3, comprising:

a stationary member assembly;

a movable member assembly mounted on said stationary member assembly;

a cable containing chamber formed into an annular configuration by said stationary and movable member assemblies, said chamber being adapted to contain a flat cable in a coiled manner therein; and means for electrically leading opposite ends of said flat cable out from said stationary and movable member assemblies, respectively;

wherein said sound-absorbing material is attached to at least one of bearing surfaces of said cable containing chamber which face opposite lateral edges of said flat cable, said one bearing surface being adapted to bear a weight of said flat cable.

8. A cable reel having a sound-absorbing material according to claim 4, comprising:

a stationary member assembly;

a movable member assembly mounted on said stationary member assembly;

a cable containing chamber formed into an annular configuration by said stationary and movable member assemblies, said chamber being adapted to contain a flat cable in a coiled manner therein; and means for electrically leading opposite ends of said flat cable out from said stationary and movable member assemblies, respectively;

wherein said sound-absorbing material is attached to at least one of bearing surfaces of said cable containing chamber which face opposite lateral edges of said flat cable, said one bearing surface being adapted to bear a weight of said flat cable.

9. A cable reel according to claim 5, wherein said sound-absorbing material having an annular configuration is attached to said bearing surface of said cable containing chamber having an annular configuration.

10. A cable reel according to claim 6, wherein said sound-absorbing material having an annular configuration is attached to said bearing surface of said cable containing chamber having an annular configuration.

11. A cable reel according to claim 7, wherein said sound-absorbing material having an annular configuration is attached to said bearing surface of said cable containing chamber having an annular configuration.

12. A cable reel according to claim 8, wherein said sound-absorbing material having an annular configuration is attached to said bearing surface of said cable containing chamber having an annular configuration.

13. A cable reel according to claim 5, wherein said sound-absorbing material including a plurality of sectoral pieces is attached at an equidistance in a circumferential direction to said bearing surface of said cable containing chamber having an annular configuration, each of said sectoral pieces being divergent from an inner peripheral edge of said bearing surface to an outer peripheral edge of said bearing surface.

14. A cable reel according to claim 6, wherein said sound-absorbing material including a plurality of sectoral pieces is attached at an equidistance in a circumferential direction to said bearing surface of said cable containing chamber having an annular configuration, each of said sectoral pieces being divergent from an inner peripheral edge of said bearing surface to an outer peripheral edge of said bearing surface.

15. A cable reel according to claim 7, wherein said sound-absorbing material including a plurality of sectoral pieces is attached at an equidistance in a circumferential direction to said bearing surface of said cable containing chamber having an annular configuration, each of said sectoral pieces being divergent from an inner peripheral edge of said bearing surface to an outer peripheral edge of said bearing surface.

16. A cable reel according to claim 8, wherein said sound-absorbing material including a plurality of sectoral pieces is attached at an equidistance in a circumferential direction to said bearing surface of said cable containing chamber having an annular configuration, each of said sectoral pieces being divergent from an inner peripheral edge of said bearing surface to an outer peripheral edge of said bearing surface.

* * * * *